US011782630B1

(12) United States Patent
Schmuck et al.

(10) Patent No.: US 11,782,630 B1
(45) Date of Patent: Oct. 10, 2023

(54) EFFICIENT USE OF OPTIONAL FAST REPLICAS VIA ASYMMETRIC REPLICATION

(71) Applicant: INTERNATIONAL BUSINESS MACHINES CORPORATION, Armonk, NY (US)

(72) Inventors: Frank Schmuck, Campbell, CA (US); Owen T. Anderson, Bellevue, WA (US); Deepavali M. Bhagwat, Cupertino, CA (US); Enci Zhong, Poughkeepsie, NY (US); Felipe Knop, Lagrangeville, NY (US); John Lewars, New Paltz, NY (US); Hai Zhong Zhou, Beijing (CN); D Scott Guthridge, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/660,220

(22) Filed: Apr. 22, 2022

(51) Int. Cl.
*G06F 12/00* (2006.01)
*G06F 3/06* (2006.01)

(52) U.S. Cl.
CPC .............. *G06F 3/065* (2013.01); *G06F 3/067* (2013.01); *G06F 3/0619* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 7,617,259 B1 | 11/2009 | Muth | |
| 8,751,859 B2 | 6/2014 | Becker-Szendy | |
| 8,850,148 B2 | 9/2014 | Fortin | |
| 10,372,685 B2 | 8/2019 | Vincent | |
| 11,036,691 B2 | 6/2021 | Lee | |
| 2008/0010507 A1* | 1/2008 | Vingralek | G06F 11/1092 714/6.32 |
| 2013/0275653 A1* | 10/2013 | Ranade | G06F 3/0605 711/E12.019 |

OTHER PUBLICATIONS

Chiu, et al., "Using Natural Mirror to Improve Data Recoverability and Availability," https://ip.com/IPCOM/000176060, IPCOM000176060D, IP.com, Nov. 3, 2008, pp. 1-4.
Volobuev, "Data and Metadata Replication in Spectrum Scale/GPFS", https://paperzz.com/doc/9055486/data-and-metadata-replication-in-spectrum-scale-gpfs, Spectrum Scale Development, Ver 1.0, Oct. 20, 2016, pp. 1-14.

* cited by examiner

*Primary Examiner* — Daniel D Tsui
(74) *Attorney, Agent, or Firm* — Caleb D. Wilkes

(57) ABSTRACT

A method and a computer system for asymmetric replication of data are provided. Storage of a set of data is organized as a first copy and as a second copy in non-volatile storage. The second copy is reliable and stored so as to be readable at a speed slower than for the first copy. A read instruction regarding the set of data is received and performed preferentially via the first copy such that the asymmetric replication achieves enhanced performance speed. A request to execute a write operation is received. The write operation is executed to the first copy and to the second copy. In response to determining that the write operation to the first copy was unsuccessful, a label for the first copy is set as stale.

25 Claims, 7 Drawing Sheets

EFFICIENT USE OF OPTIONAL FAST REPLICAS VIA ASYMMETRIC REPLICATION

BACKGROUND

The present invention relates to data storage in computer memory to achieve high-performance storage that is also reliable.

SUMMARY

According to an exemplary embodiment, a method for asymmetric replication of data is provided. Storage of a set of data is organized as a first copy in non-volatile storage and as a second copy in non-volatile storage. The first copy is stored so as to be readable at a first speed. The second copy is reliable and stored so as to be readable at a second speed slower than the first speed. A read instruction regarding the set of data is received. The read instruction is performed preferentially via the first copy such that the asymmetric replication achieves enhanced performance speed. A request to execute a write operation is received. The write operation is executed to the first copy and to the second copy. It is determined whether the write operation to the first copy was successful and whether the write operation to the second copy was successful. In response to determining that the write operation to the first copy was unsuccessful, a label for the first copy is set as stale. A computer system corresponding to the above method is also disclosed herein.

According to another exemplary embodiment, a method for asymmetric replication of data is provided. Storage of a set of data is organized as a first copy in non-volatile storage and as a second copy in non-volatile storage. The first copy is stored so as to be readable at a first speed. The second copy is stored so as to be readable at a second speed slower than the first speed. At least one of the first copy and the second copy are in a first node. Upon failover of the first node to a backup node, a new write operation for the set of data is allocated to the backup node based on a configuration of the first node.

According to another embodiment, a computer-implemented method for asymmetric replication of data is provided. Storage of a set of data is organized as a first copy in non-volatile storage and as a second copy in non-volatile storage. The first copy is stored so as to be readable at a first speed. The second copy is stored so as to be readable at a second speed slower than the first speed. The first copy and at least part of the second copy are in a same first node. One or more bits indicating whether at least some of the first copy and the second copy is stale are created. An operation request regarding the set of data is received. The one or more bits associated with the operation request are checked to determine a status of the one or more bits. The operation request is performed preferentially via the first copy or via the second copy based on the status of the one or more bits.

According to another embodiment, a computer-implemented method for asymmetric replication of data is provided. Storage of a set of data is organized as a first copy in non-volatile storage and as a second copy in non-volatile storage. The first copy is stored so as to be readable at a first speed. The second copy is stored so as to be readable at a second speed slower than the first speed. The first copy and at least part of the second copy are in a same first node. A read instruction regarding the set of data is received. The read instruction is performed preferentially via the first copy such that the asymmetric replication achieves enhanced performance speed.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for asymmetric replication of data in a manner which achieves replica consistency for reliability purposes and which also achieves fast performance. The fast performance is helpful in various instances such as for read-intensive workloads. The embodiments achieve performance that is as good as the performance for fast storage which does not have replication for reliability purposes. The embodiments also achieve reliability that is as dependable in the face of failures as the reliability for traditional symmetric replication which does not have fast performance speed. The present embodiments allow improved resistance to disruption from other workloads and may implement persistent storage to achieve this resistance. Cold starts from cache loss may be avoided with the present embodiments which implement persistent storage. The present embodiments allow enhanced flexibility for reliable storage by allowing greater variety of timing for reliable replica allocation and writes. The present embodiments decouple reliability constraints from performance constraints. The asymmetric and heterogeneous storage manner of the multiple copies allows the embodiments to achieve the benefits of each storage manner. The present embodiments allow repairs of inconsistent replicas to be performed via a convenient timing while allowing skipping over allocations and writes for an optional replica, e.g., for a fast replica. The present embodiments successfully manage replicas with distinct performance and reliability characteristics and manage stale replicas. The present embodiments help with the handling of write errors, replica consistency, avoiding stale replicas, and asynchronous repair of stale replicas. The present embodiments facilitate the smooth handling of updates which might cause temporary staleness or temporary inconsistency which are correctable at a convenient time.

Thus, the present embodiments achieve a direct improvement in the functioning of a computer including by achieving improved processor interaction with computer memory storage which stores data.

Figure 1A:
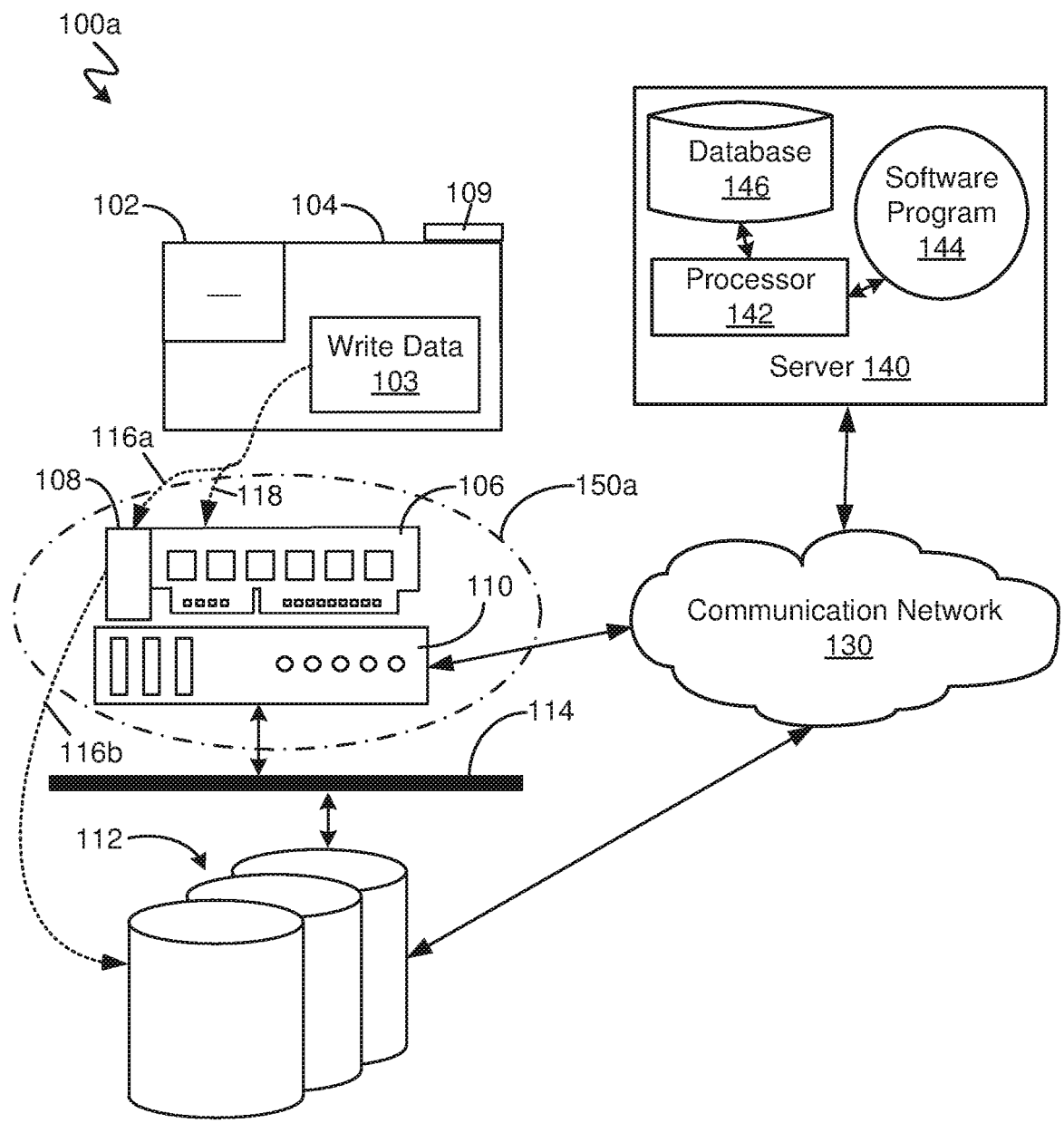
FIG. 1A illustrates a computer environment in which asymmetric replication of data including a write to multiple replicas may be carried out according to at least one embodiment.

FIG. 1A illustrates a first computer environment 100a in which asymmetric replication of data including a write to multiple replicas may be carried out according to at least one embodiment. FIG. 1A depicts when these writes occur without errors to the multiple replicas. A file 104 that includes data may be stored as a first fast copy and as a second reliable copy. The first fast copy may be stored in performance storage in persistent memory 106 that is directly connected to a host computer 110. The persistent memory 106 is an example of non-volatile storage. The first fast copy may be referred to as a performance replica that is readable, e.g., via a processor, at a first speed. The second reliable copy may be stored in a disk array 112 and/or in the persistent memory 106 that is directly connected to a host computer 110. If stored in the persistent memory 106, then the second reliable copy is stored separately from the first fast copy in the persistent memory 106. The persistent memory may have a high speed connection (such as via a peripheral component interconnect express (PCIe) and/or a non-volatile memory express (NVMe)) to the host computer 110. The second reliable copy is stored so as to be readable at a second speed that is slower than the first speed at which the first fast copy (performance replica) is readable. The second reliable copy may be referred to as a reliable replica. The file 104 may include replicated disk addresses which contain references to both copies (performance and reliable). The file 104 may also include a block map. The block map adds a stale bit to the replicated disk address. A disk address may be a location in the storage subsystem at which a given block of data is located. A disk address may include one or more of a disk identifier and a sector offset within the disk.

In at least some embodiments, a disk array controller 108 is part of the persistent memory 106 and controls and organizes the arrangement and organization of data within the disk array 112. In some embodiments, the disk array 112 may be a RAID array, specifically a redundant array of independent disks (RAID) array. A direct connector 114 may connect the host computer 110 including the persistent memory 106 with the disk array 112. In some embodiments, the direct connector 114 may be an input/output bus, e.g., a high-speed input/output bus. In other embodiments the direct connector 114 may be a storage area network (SAN) which is a dedicated high-speed network that provides access to block-level storage.

The SAN embodiment of the direct connector 114 is to be distinguished from a general network such as the communication network 130 depicted in FIG. 1A which may connect other computers to the host computer 110 but not in a direct connection. The host computer 110 and the disk array 112 may be connected to the communication network 130 and via the communication network 130 indirectly to external computers such as the server 140. The server 140 may include a processor 142, a software program 144, and a database 146. The processor 142 may be used to execute the software program 144 and may access data in the database 146 for storage and retrieval of data.

In the embodiment shown in FIG. 1A, the host computer 110 and the persistent memory 106 connected thereto constitute a first node 150a. The server 140 and other computers that are connected to the communication network 130 but are not directly connected to the host computer 110 or the persistent memory 106 are not a part of that first node 150a. These other computers are not part of the first node 150a because these other computers must communicate across the communication network 130 in order to communicate with the host computer 110 and the persistent memory 106. A controller, namely the disk array controller 108, for the disk array 112 is part of the first node 150a of the host computer 110 and the persistent memory 106. Some remaining portions of the disk array 112 apart from the disk array controller 108 may in some embodiments be considered to be external to the first node 150a.

A metadata database 109 may be stored in the computer memory such as in the disk array 112. The metadata database 109 may be stored in reliable memory and may include a stale bit database, other metadata data, and index nodes (Modes). The metadata database 109 may be stored in memory which provides as great as reliability as the second reliable copy has. The metadata database 109 may be stored along with the file 104 and may share availability and reliability with the file 104. This stale bit database may be updated if a write command to one, both, or all of the replica copies is unsuccessful which means that the particular replica no longer is completely current with the data. This update may include changing a label to be "stale" which means that the current data set in the respective replica is no longer completely current. If a repair to a replica is made and an update is thereafter completed to that replica, then a "stale" label for the replica may be cleared in the metadata database 109 so that this replica is labeled as "not stale". Creating and using the metadata database 109 to include a stale bit database for the multiple data copies/replicas may help keep data storage up-to-date and may help avoid file corruption from updates being missed or added in an out-of-order sequence. The stale bit may be in the disk address (DA) instead of in an index node (Mode). The index node (Mode) may be a data structure and a unique identifier in a hierarchical file system structure which has a root at a base of the file system and the other directories spreading from the base. An Mode may represent a given file in the file system and may contain important metadata related to that file.

FIG. 1A depicts an example of a write operation occurring to the file 104 and its multiple copies. Specifically, write data 103 may be received for writing to the first copy and to the second copy. First, a stale data bit for one, both, and/or all of the stored replicas may be checked for developing the data action plan. The metadata database 109 may be accessed via the processor of the host computer 110 to determine whether the stale bit for the first copy and/or the second copy indicates that the respective copy is stale, i.e., is not current. The "—" sign in the stale bit field 102 indicates that no indication of data staleness, i.e., of the stored data being out-of-date, has been left in the database. Thus, the host computer processor may perceive that proceeding with the write operations for the multiple copies to write the write data 103 into the stored copies is appropriate for maintaining the up-to-date copy.

For writing to the first fast copy, a write step 118 executes to the persistent memory 106 in order to update the first fast copy that is stored in the persistent memory 106. In some embodiments, the fastest memory available to the host computer 110 may be used to store the first fast copy that is a performance copy/replica.

For writing to the second copy, namely to the reliable copy, a first reliable write step 116a executes to the disk array controller 108 that is part of the persistent memory 106 and is within the same first node 150a in which the first fast copy is disposed. The disk array controller 108 includes non-volatile memory. Next, in a second reliable write step 116b the disk array controller 108 sends the write command to the disk array 112 for the write data 103 to be written into the second reliable copy. The second reliable copy may be distributed amongst components of the disk array 112 which includes non-volatile memory.

In some embodiments, the second reliable copy is made with an erasure coding, e.g., as an erasure coded virtual disk. A RAID scheme is an example of an erasure coding. In other embodiments, the second reliable copy may be formed via a replication as a type of erasure coding. In other embodiments, the second reliable copy may be formed via non-flash/3DXP storage technology. In some embodiments the reliable copy may be considered to be a reliable copy by allowing dual access. The reliable copy may have a greater reliability than the fast copy has, e.g., by having at least double the mean time between failures (MTBF) than the fast copy has.

Other ways to implement reliable storage for the second reliable copy may alternatively or additionally be implemented.

The processor of the host computer 110 is programmed to make and organize the multiple replicas in a manner so that the replicas are accessible at different speeds via the processor. The processor may allocate, e.g., reserve, the space in the memory for the storage replicas. The processor of the host computer 110 is also programmed with the described algorithms governing the allocations, modifications, and accessing of the multiple replicas of the file. Thus, a disk array 112 itself may be governed by the control of the processor of the host computer 110 and the logic and algorithms of the processor of the host computer 110. The processor of the host computer 110 is programmed to organize and have the first performance replica be readable and accessible at a first speed, for the second reliable copy to be readable and accessible at a second speed, and for the first speed to be greater than the second speed. Thus, the performance replica may be accessed and read more quickly and in a shorter time than it takes for the reliable replica to be accessed and read.

Figure 1B:
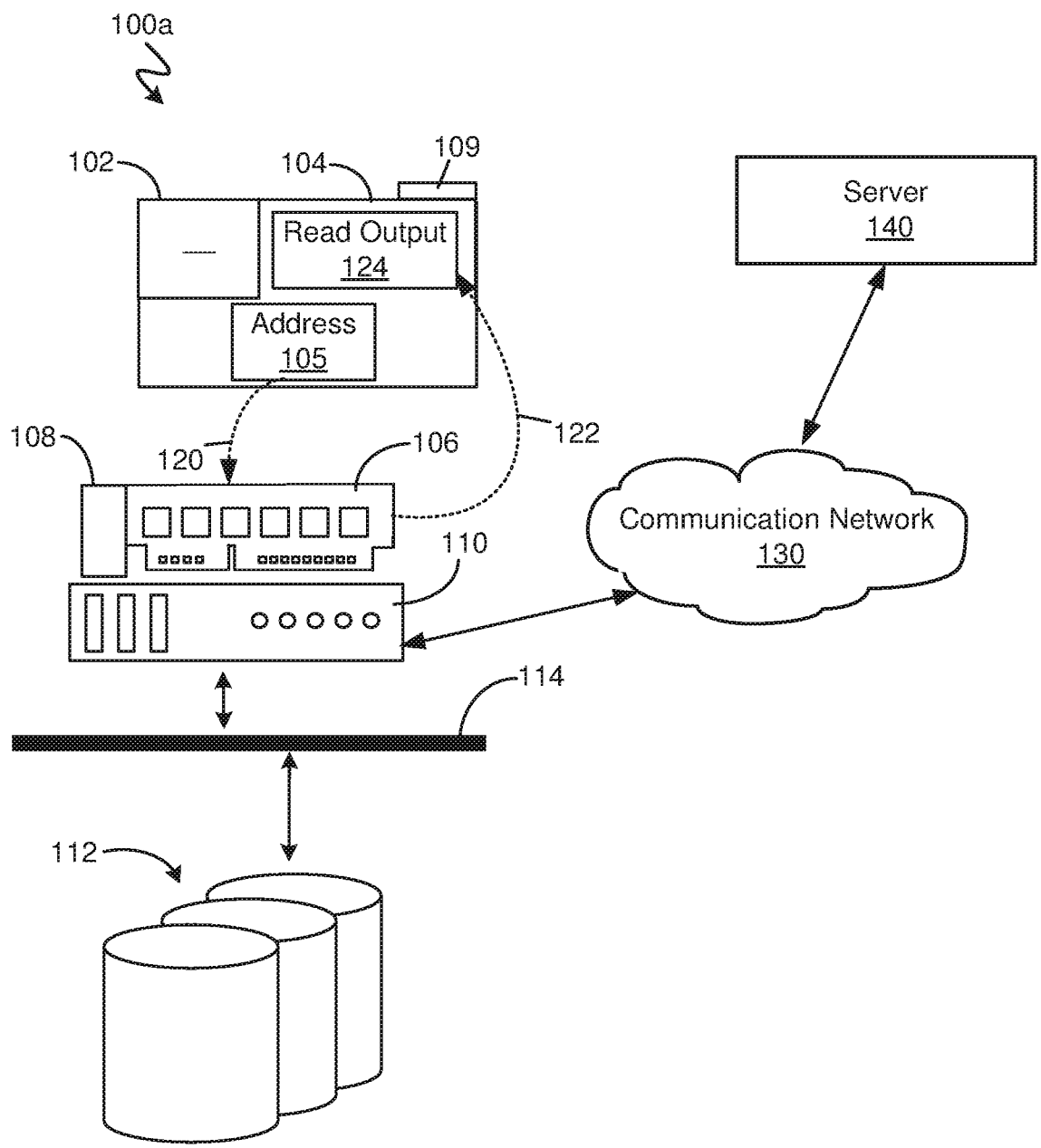
FIG. 1B illustrates a computer environment in which a read from asymmetrically replicated data may be carried out according to at least one embodiment.

FIG. 1B illustrates the same first computer environment 100a that was shown in FIG. 1A so that the same reference numerals refer to those same elements that were described above with respect to FIG. 1A. FIG. 1B shows, however, an instance in which the first computer environment 100a is used to perform a read operation from the asymmetrically replicated data. FIG. 1B depicts when the read operation occurs without an error in the operation.

In FIG. 1B, first, a stale data bit for one, both, and/or all of the stored replicas may be checked for developing the data action plan. The metadata database 109 in the persistent memory 106 may be accessed to determine whether the bit for the first copy and/or the second copy indicates that the respective copy is stale, i.e., is not current. The "–" sign in the stale bit field 102 indicates that no indication of data staleness, i.e., of the stored data being out-of-date, has been left in the metadata database 109. Thus, the processor of the host computer 110 may perceive that proceeding with the read operation from the multiple copies to read some requested data is appropriate to retrieve up-to-date data.

An address 105 of the file 104 may be used to find the desired data that is being stored in the first copy within the persistent memory 106. First read step 120 shows the address 105 being used to find a correct location within the performance copy within the persistent memory 106. Using the address 105, data may be retrieved from the first fast copy/replica within the persistent memory 106 and may be provided as read output 124 for fulfillment of the read operation. Second read step 122 depicts this data retrieval from the performance copy to a data readout area, e.g., via the processor of the host computer 110.

Because in this instance the read from the performance copy was successful, no read from the second reliable copy is required. Reading from this reliable copy, e.g., in the disk array 112, is slower than reading from the first fast copy. Thus a high performance speed may be achieved by avoiding reading from the second copy.

Figure 1C:
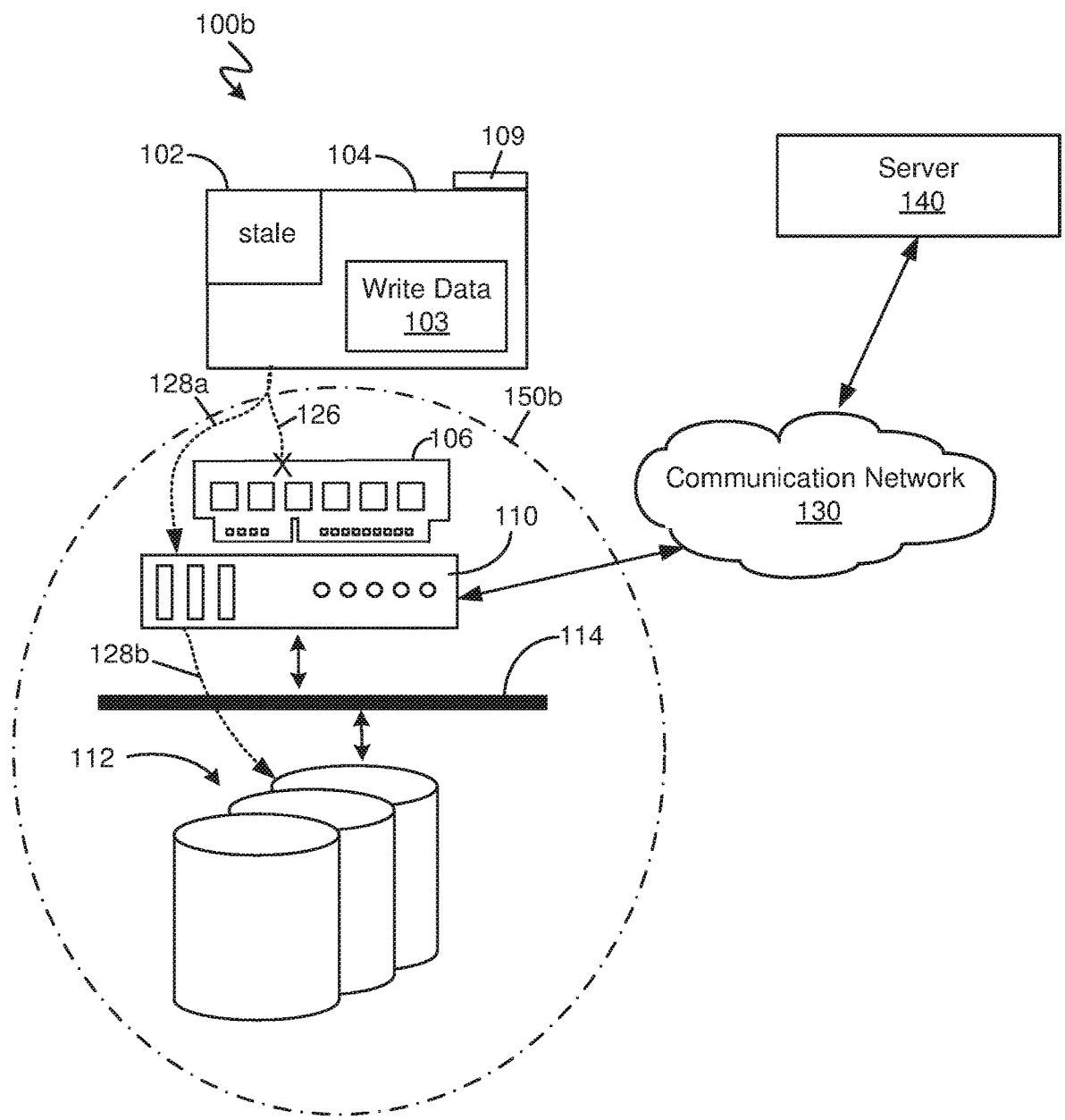
FIG. 1C illustrates a computer environment in which asymmetric replication of data including a partially successful write to multiple replicas may be carried out according to at least one embodiment.

FIG. 1C illustrates a second computer environment 100b that is similar to the first computer environment that was shown in FIG. 1A. For elements of the second computer environment 100b that are the same as the elements in the first computer environment 100a, the same reference numerals are used in FIG. 1C as were used in FIG. 1A.

FIG. 1C shows an instance in which a partially successful write operation is performed with the asymmetrically replicated data in the second computer environment 100b. FIG. 1C also shows a second node 150b which has a different scope than the first node 150a that was shown in FIG. 1A. The second node 150b includes not only the host computer 110 and the persistent memory 106 connected thereto but also includes the disk array 112 connected to the host computer 110 via the direct connector 114. In some embodiments with the second node 150b, the direct connector 114 may be an input/output bus, e.g., a high-speed input/output bus. In other embodiments with the second node 150b the direct connector 114 may be a storage area network (SAN) which is a dedicated high-speed network that provides access to block-level storage. In this second node 150b, a disk array controller is not collocated in the persistent memory 106 with the first performance copy. The processor of the host computer 110 may nevertheless organize and facilitate efficient allocation, reading, and writing to a reliable copy in the disk array 112 without needing to communicate over the communication network 130.

In FIG. 1C, first, a stale data bit for one, both, and/or all of the stored replicas may be checked for developing the data action plan. The metadata database 109 may be accessed by the processor of the host computer 110 to determine whether the bit for the first copy and/or the second copy indicates that the respective copy is stale, i.e., is not current. The "stale" indicator in the stale bit field 102 shown in FIG. 1C indicates that the data in the fast copy has been marked as being stale, i.e., not current. Thus, the processor may perceive that proceeding with the write operation for the second copy is appropriate and that proceeding with the write operation for the first copy is not appropriate and should be deferred. The first copy will need to be repaired before the new data should be written to the first copy. A first copy write avoidance 126 is shown in FIG. 1C to exemplify the avoidance of writing to the first copy and to distinguish between the multiple write operation that occurs in the FIG. 1A embodiment.

For writing to the second copy, namely to the reliable copy, in reliable write steps 128*a* and 128*b* the host computer 110 sends the write command to the disk array 112 for the write data 103 to be written into the second reliable copy. The second reliable copy may be distributed amongst the disk array 112.

If the write succeeds to both replicas, then a repair may be deemed to be affected once the stale bit is cleared. Repair may be performed by trying to write the performance replica to the same contents to which the data was written for the reliable copy. For repair-after-read the value just read from the reliable copy may be used. Skipping a write to the first copy if stale is an option (defer to repair). Either skipping a first write or integrating repair with a write may be performed in some embodiments.

FIG. 1C illustrates that although the host computer 110 may communicate with other computers such as the server 140 via the communication network 130, the communication network and external computers such as the server 140 are not part of the second node 150*b*.

The host computer 110 includes a processor and computer memory such as the persistent memory 106. The processor is enabled to run one or more software programs. The persistent memory 106 is configured to store one or more software programs. The communication network 130 allowing communication between the host computer 110, the disk array 112, and the server 140 may include various types of communication networks, such as the Internet, a wide area network (WAN), a local area network (LAN), a telecommunication network, a wireless network, a public switched telephone network (PTSN) and/or a satellite network.

It should be appreciated that FIGS. 1A-1C provide only illustrations of some implementations and do not imply any limitations with regard to the environments in which different embodiments may be implemented. Many modifications to the depicted environments and hardware components may be made based on design and implementation requirements.

The host computer 110 may communicate with the server 140 via the communication network 130. The communication network 130 may include connections such as wire, wireless communication links, and/or fiber optic cables. As will be discussed with reference to FIG. 3, server 140 may include internal components 902*a* and external components 904*a*, respectively, and the host computer 110 may include internal components 902*b* and external components 904*b*, respectively. Server 140 may also operate in a cloud computing service model, such as Software as a Service (SaaS), Platform as a Service (PaaS), or Infrastructure as a Service (IaaS). Server 140 may also be located in a cloud computing deployment model, such as a private cloud, community cloud, public cloud, or hybrid cloud. The host computer 110 may be, for example, a mobile device, a telephone, a personal digital assistant, a netbook, a laptop computer, a tablet computer, a desktop computer, or any type of computing device and/or computer capable of running a program, accessing a network, and accessing a database 146 and a software program 144 in a server 140 that is remotely located with respect to the host computer 110.

Figure 2A:
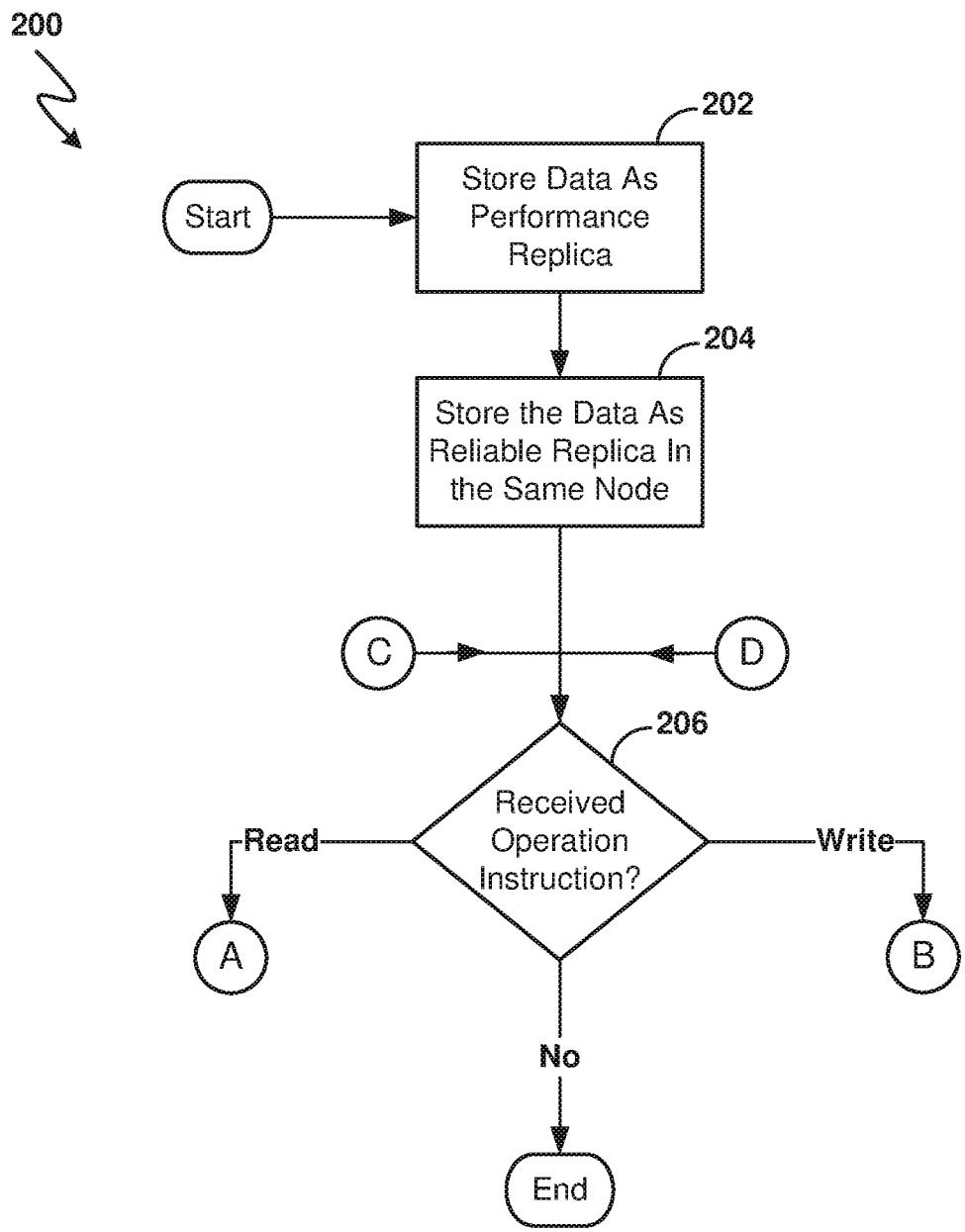
FIG. 2A illustrates an asymmetric replication process according to at least one embodiment.

Referring now to FIG. 2A, an operational flowchart depicts an asymmetric replication process 200 that may, according to at least one embodiment, be performed using one or more of the host computer, computer memory, and hardware setups that are shown in FIGS. 1A-1C.

In a step 202 of the asymmetric replication process 200, data is stored as a performance replica. This data may be from a file 104 that is shown in FIGS. 1A-1C. Data may be transmitted and/or uploaded to the host computer 110 shown in FIGS. 1A-1C in order for a processor of the host computer 110 to organize and cause storage of the data as a performance replica. This performance replica may be stored on a performance disk, e.g., on a high-performance disk. The persistent memory 106 shown in FIGS. 1A-1C may in some embodiments include a performance disk and may include flash memory such as a solid-state drive without moving/spinning parts. The flash memory may be divided into memory cells. A processor of the host computer 110 may cause and control the storage of step 202.

In a step 204 of the asymmetric replication process 200, the data is also stored as a reliable replica in the same node in which the performance replica was stored. This reliable replica may be a second copy of the data as compared to the first copy of the data that was created in step 202. The reliable replica may be stored in flash/performance storage (as the performance replica was stored in this storage), but in a manner which is more dependable/reliable and also slower to access, e.g., for read operations. The reliable replica may be stored as an erasure coding. The reliable replica may alternatively be stored in a different storage device altogether, e.g., may be stored in a disk array 112, e.g., a RAID disk array, as compared to the type in which the performance replica is stored. This embodiment with the copies/replicas on heterogeneous storage devices allows the system and method to gain the best features of each of the heterogeneous storage devices. The reliable replica may be stored with redundancy which allows easier repair and backup for the data set. The reliable replica may be stored in a redundant manner so as to be reconstructable after an error.

For steps 202 and 204, the processor of the host computer 110 may in at least some embodiments perform allocation of the storage space for the two replicas independently from each other. The path for the reliable replica is allocated by finding a free block. Another path for the performance replica is allocated by finding another free block.

The two replicas created in steps 202 and 204 are peer replicas in that they are set up to be accessed independently from each other via the processor of the host computer 110. The processor of the host computer 110 does not need to communicate through the performance replica to reach the reliable replica. The processor of the host computer 110 does not need to communicate through the reliable replica to reach the performance replica.

In a step 206 of the asymmetric replication process 200, a determination is made whether an operation instruction is received. If an operation instruction is received, step 206 also includes determining what type of operation instruction is received. If an operation instruction that is a read command is received, then after step 206 the asymmetric replication process proceeds to element "A" shown in FIG. 2A. This element "A" then jumps to the element "A" for the read operation branch 200R shown in FIG. 2B. If an operation instruction that is a write command is received, then after step 206 the asymmetric replication process proceeds to element "B" shown in FIG. 2A. This element "B" then jumps to the element "B" for the write operation branch 200W shown in FIG. 2C. If no operation instruction is received, then the asymmetric replication process may conclude. The processor of the host computer 110 may receive an instruction and interpret the instruction to perform the determination of step 206. For example, the processor may read code or bits of the instruction to determine the type of the instruction that is received. The host computer 110 and its processor may receive various transmissions and inputs which may include instructions for altering the saved data set and particularly the multiple replicas of the data set.

Figure 2B:
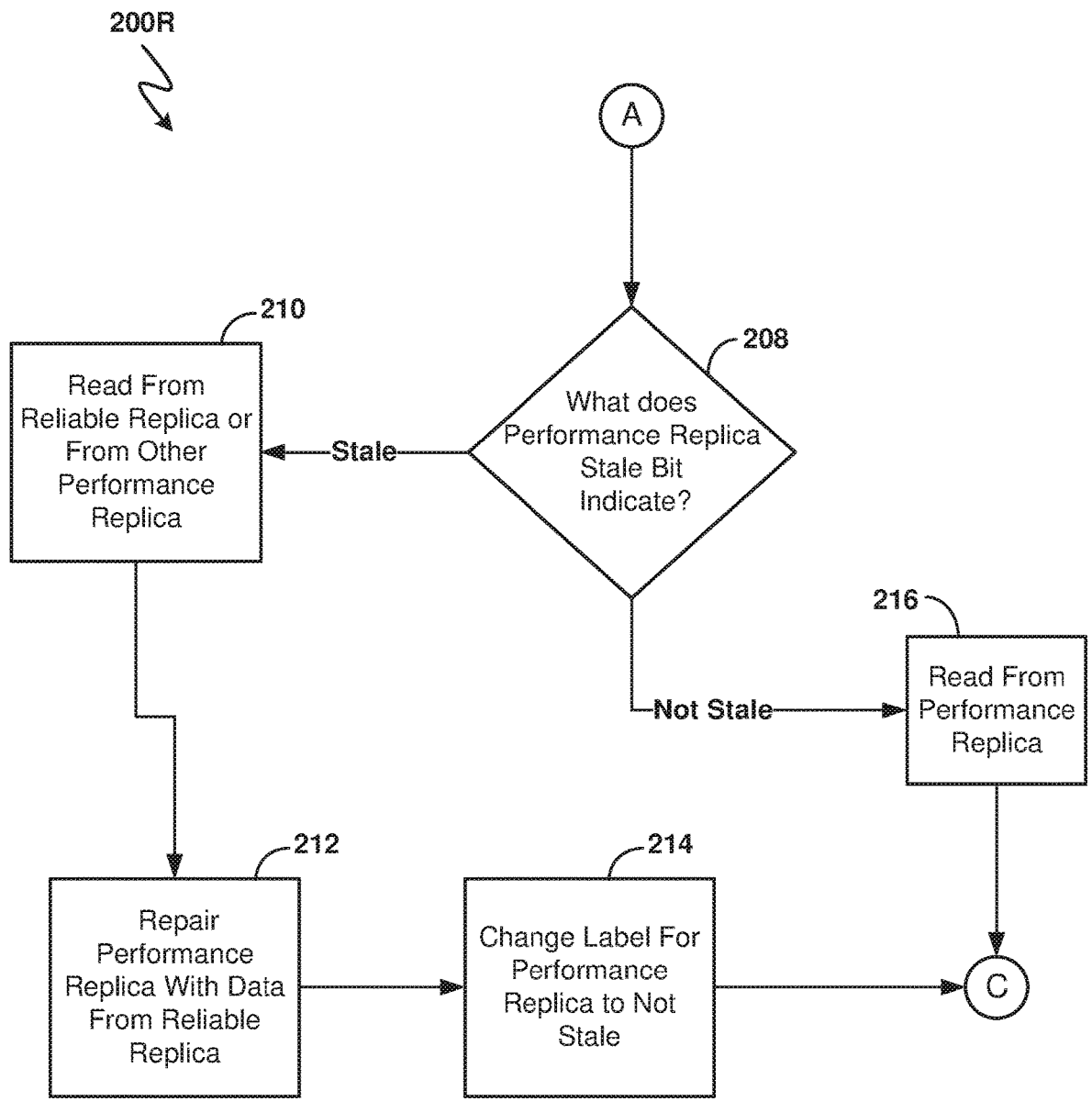
FIG. 2B illustrates a read operation branch from the asymmetric replication process of FIG. 2A according to at least one embodiment.

Element "C" shown in FIG. 2A links to the element "C" shown in FIG. 2B which depicts the read operation branch 200R. Thus, element "C" shown in FIG. 2A indicates a return point after completion of the read operation branch 200R shown in FIG. 2B.

Figure 2C:
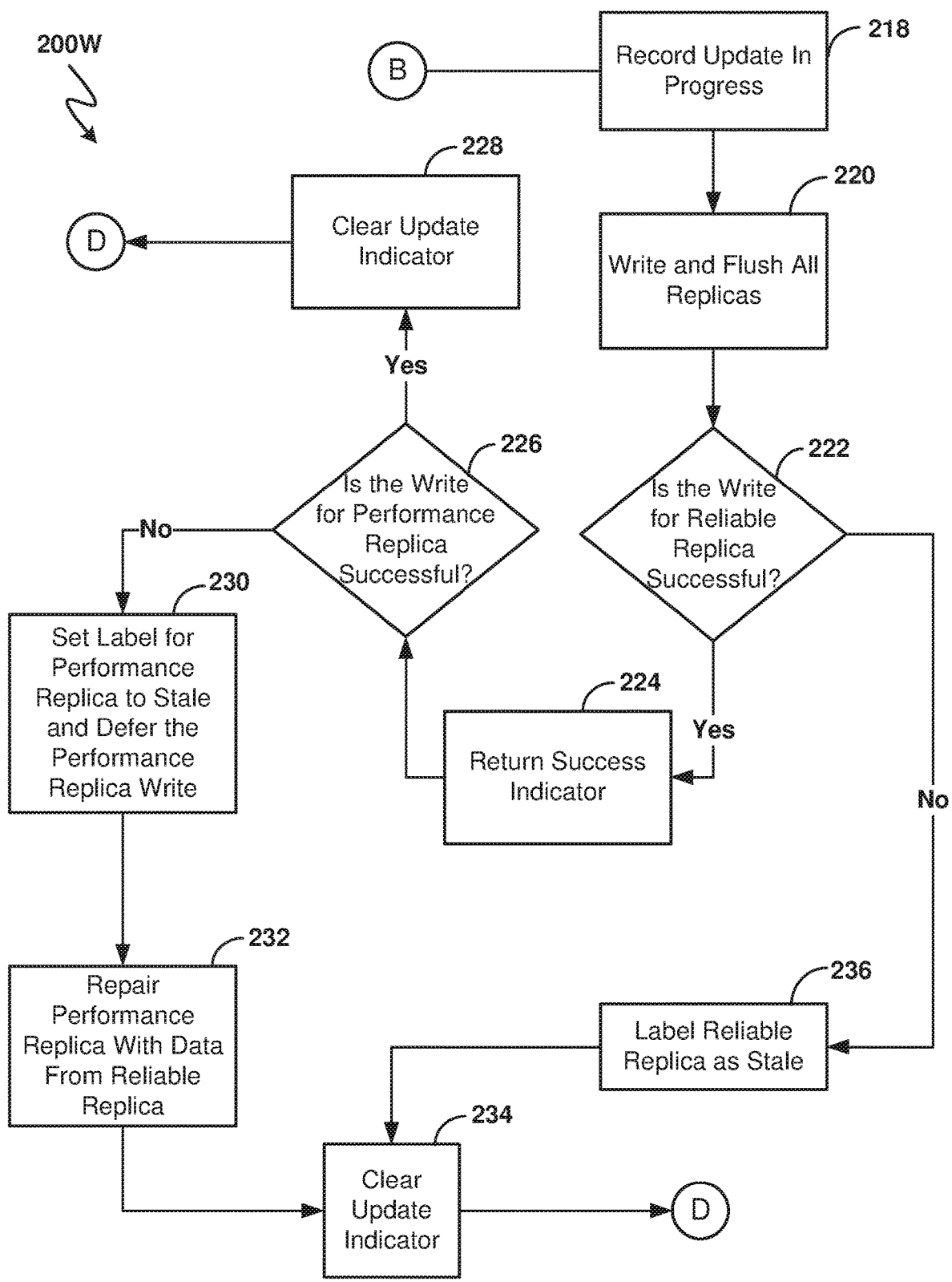
FIG. 2C illustrates a write operation branch from the asymmetric replication process of FIG. 2A according to at least one embodiment.

Similarly, element "D" shown in FIG. 2A links to the two elements "D" shown in FIG. 2C which depicts the write operation branch 200W. Thus, the two elements "D" shown in FIG. 2A indicate a respective return point after completion of the write operation branch 200W shown in FIG. 2C.

FIG. 2B illustrates a read operation branch 200R from the asymmetric replication process 200 of FIG. 2A according to at least one embodiment. The read operation branch 200R starts at point "A" which links to the point "A" from the asymmetric replication process 200 shown in FIG. 2A. Thus, the read operation branch 200R shown in FIG. 2B is part of the asymmetric replication process 200 shown in FIG. 2A and may be invoked by the asymmetric replication process 200 reaching the point "A".

In a step 208 of the read operation branch 200R, a determination is made regarding what a performance replica stale bit indicates. If the determination of step 208 is that the performance replica stale bit indicates that the performance replica is stale, then the read operation branch 200R proceeds to step 210. Step 210 is part of a stale branch that includes steps 210, 212, and 214. The stale branch is part of the read operation branch 200R. If the performance replica is deemed unavailable despite no stale label for the stale bit, in this alternative the read operation branch 200R may still proceed down the stale branch of steps 210, 212, and 214. If the determination of step 208 is that the performance replica stale bit indicates that the performance replica is not stale, then the read operation branch 200R proceeds to step 216. Step 216 itself constitutes a not-stale branch of the read operation branch 200R.

A processor of a computer such as the host computer 110 shown in FIGS. 1A-1C may access a database such as the metadata database 109 to check the stale bit for step 208. The replica may be stale when the replica is not current, i.e., is not up-to-date with the most recent updates. The stale bit field 102 shown in FIGS. 1A-1C may indicate whether the data in the fast copy, e.g., in the performance replica, has been marked as being stale, i.e., not current.

For the stale branch of the read operation branch 200R, in a step 210 a read from the reliable replica or from another performance replica is performed. In the computer environments shown in FIGS. 1A-1C this read of step 210 may occur via the processor of the host computer 110 reading from the replica in the disk array 112 instead of from the fast copy in the persistent memory 106. An address for identifying the location of the requested data may be sent, and in response the stored data at that location may be returned to the processor of the host computer 110. The processor may cause a display of the returned value or some other usage of the returned value. This read from the reliable replica of step 210 may occur via a direct connector 114. If the reliable replica is also in the persistent memory 106 then this read of step 210 may alternatively occur from an intra-data transmission within the host computer 110-attached persistent memory 106 setup. Thus, with step 210 failover to another one of the replicas may freely occur upon failure of the performance replica.

In other embodiments, multiple fast copies of the data set may be created via the processor of the host computer 110. In such embodiments, if the primary fast copy is stale then data may be read in step 210 from a secondary fast copy of the data set. This secondary fast copy must also be within the particular data node, e.g., within the first node 150a or within the second node 150b that were shown in FIGS. 1A and 1C, respectively. Write-affinity depth implications may determine a number of replicas that are generated by the processor for a replica count. A write-affinity depth implication may include a policy that allows an application to determine the layout of a file in a cluster to optimize for typical access patterns. This secondary fast copy may be considered a third copy in view of the first two copies—namely the primary performance replica and the reliable replica. The third copy may be stored so as to be readable at a third speed that is faster than the second speed at which the reliable replica maybe read. The third copy may be in the same first node as the performance copy and the reliable copy.

Multiple performance replicas may be added or removed dynamically according to access patterns with low overhead. Storage for performance replicas may be shared and moved between applications in order to optimize system performance.

In a step 212 of the read operation branch 200R, the performance replica is repaired with data from the reliable replica. Additional information concerning a location of a stale portion of a data set may be stored along with the stale bit, e.g., in the metadata database 109. The processor of the host computer 110 may analyze this location information, may retrieve corresponding data from the reliable copy, and then rewrite the particular location in the performance replica with the retrieved data from the reliable replica. Thus, this repair of step 212 may include a transmission via a connector such as the direct connector 114 or may include an intra-data transmission within the host computer 110-attached persistent memory 106 setup. In some embodiments, the repair of step 212 may be skipped or deferred.

In a step 214 of the read operation branch 200R, the label for the performance replica is changed to indicate that the performance replica is not stale. This label may be that bit that was analyzed in step 208. The label may be binary and indicate a "stale" or "not stale" condition. A "Stale" sign in the stale bit field 102 may in step 214 be switched to "—" to indicate that the particular replica, in case the performance replica, is no longer stale and is now current. Thus, the data being out-of-date will then not block this data set from being read and will not block writes to this data set. This label that is updated may be in the metadata database 109 shown in FIG. 1 in the persistent memory 106. The processor of the host computer 110 may control and/or perform this label change of step 214.

After step 214, the read operation branch 200R proceeds to point "C" which links to point "C" in the asymmetric replication process 200 of FIG. 2A. Thus, after completion of step 214 which constitutes a completion of the stale branch (i.e., steps 210, 212, and 214) of the read operation branch 200R the read operation branch 200R may return to check for more operation instructions, i.e., for a repeat of the determination of step 206 shown in FIG. 2A.

For the not stale branch of the read operation branch 200R, in step 216 a read from the performance replica is performed. FIG. 1B depicts a successful performance of step 216 in that with a first read step 120 the address 105 is used to find a correct location within the performance copy within the persistent memory 106 and with a second read step 122 the retrieved data is provided as read output 124. The processor of the host computer 110 may perform and/or control the reading of step 216.

The completion of step 216 constitutes completion of the not stale branch of the read operation branch 200R.

After step 216, the read operation branch 200R proceeds to point "C" which links to point "C" in the asymmetric replication process 200 of FIG. 2A. Thus, after completion of step 216 which constitutes a completion of the "not stale" branch of the read operation branch 200R the read operation branch 200R may return for checking for more operation instructions, i.e., for a repeat of the determination of step 206 shown in FIG. 2A.

FIG. 2C illustrates a write operation branch 200W from the asymmetric replication process 200 of FIG. 2A according to at least one embodiment. The write operation branch 200W starts at point "B" which links to the point "B" from the asymmetric replication process 200 shown in FIG. 2A. Thus, the write operation branch 200W shown in FIG. 2C is part of the asymmetric replication process 200 shown in FIG. 2A and begins if an operation instruction received in step 206 is a write operation.

In a step 218 of the write operation branch 200W, an update in progress is recorded. The processor of the host computer 110 may also create a replication pending bit and corresponding table in the metadata database 109. Changing of the status of this bit causes the bit to indicate that a write operation is in progress so that other instructions should be postponed and/or deferred until the write operation is complete. The processor may change this replication pending bit in order to perform step 218. The processor may check this bit before performing other operations in order to learn whether the replica is up-to-date and ready for performance of the other operation. This recording of the update may be performed robustly. Instead of a replication pending bit, the recording of the update in progress may be performed by making an entry in a log which contains update beginning and ending entries. A beginning entry may be a log entry produced before any of the replicas is written. An ending entry may be a log entry produced after all replicas have been written.

In a step 220 of the write operation branch 200W, the write operation is performed for all of the replicas and all of the replicas are flushed. For step 220, the processor of the host computer 110 may cause a write to a performance replica in performance storage and also cause a write to the reliable replica. If multiple performance replicas were created, then the processor in step 220 may cause a respective write to each of the performance replicas. The processor may transmit the new data in an intra-computer transmission so that the performance replica in the persistent memory 106 is updated, e.g., rewritten with the new data. The processor may transmit the new data to a reliable replica also as an intra-computer transmission to a reliable replica in the persistent memory 106 so that this reliable replica is updated, e.g., rewritten with the new data. If the reliable replica is somewhere else in the node, e.g., within other data storage that has a high-speed local connection to the host computer, then the processor of the host computer may cause the transmission of the new data to the data storage, e.g., to the disk array 112 for the rewriting of the new data into the reliable replica. After the writing, each level of the software of the replica may be flushed to ensure that the rewrite was passed through each level of the replica.

In a step 222 of the write operation branch 200W, a determination is made as to whether the write operation of step 220 for the reliable replica was successful. If step 222 is affirmative in that the write for the reliable replica is determined as having been successful, then the write operation branch 200W proceeds to step 224. If step 222 is negative in that the write for the reliable replica is determined as having been unsuccessful, then the write operation branch 200W proceeds to step 238.

In a step 224 a success indicator for the reliable replica write operation step of 220 is returned. The processor of the host computer 110 may create and update a write tracker stored in the metadata database 109. The write tracker may be updated upon completion of a write operation. A local transmission or a transmission via the direct connector 114 may be sent to the processor of the host computer 110 as part of step 224.

In a step 226 of the write operation branch 200W, a determination is made as to whether the write operation of step 220 for the performance replica was successful. If step 226 is affirmative in that the write for the performance replica is determined as having been successful, then the write operation branch 200W proceeds to step 228. If step 228 is negative in that the write for the performance replica is determined as having been unsuccessful, then the write operation branch 200W proceeds to step 230.

In a step 228 following an affirmative indication determined in step 226 for the performance replica write, the update indicator that was set in step 218 is cleared. This update indicator may be a replication pending bit. Once the write operation is no longer occurring, then other operations do not need to be delayed because of the write operation. The processor of the host computer 110 may update the replication pending bit in the metadata database 109 in order to perform the step 218. Because the stale bit was set for the write instruction in step 218, the active replication pending bit may be changed in step 228 to indicate that no write action is currently pending/occurring to the replicas.

After step 228 of the write operation branch 200W, point "D" is reached which means that the write operation branch 200W is concluded and a return to the asymmetric replication process 200 of FIG. 2A occurs. Thus, a check for a new operation instruction may be performed as a repeat of step 206 of the asymmetric replication process 200 shown in FIG. 2A.

In a step 230 following a negative determination in step 226 for the performance replica write, a label for the performance replica is set to stale and the performance replica write is deferred. The processor of the host computer 110 may update a stale label for the performance replica in the metadata database 109 if the performance replica write was unsuccessful. This change of the label may give notice that other operations to the performance replica should be deferred because the performance replica no longer has fully current data. This deferral may also be referred to as a skipping over of the performance replica write. Individual disk addresses for the intended write may be labeled as part of the labelling of step 228. The skipping/deferring occurs when necessary to preserve availability of the data.

An advantage of the present embodiments is that a repair to the performance replica may be performed as a lazy repair, e.g., in a non-urgent timing, and may be deferred to a subsequent non-immediate time. Thus, the writes to the different replicas may be entirely asynchronous because the performance replica write may be performed entirely after the reliable replica write is complete. So long as a write to the reliable replica was successful, the reliable replica may subsequently be used to repair the performance replica to receive the data from this write operation. This feature of allowing a deferred repair may cause the performance replica to be deemed an optional replica. A failure to allocate a performance replica does not impact a correctness and/or a reliability of the stored data, because the stored data is still accessible from the reliable replica. If the performance disk is already fully allocated, then a failure to allocate may occur if there is no other place to reserve for the data for storage.

In a step 232 of the non-successful performance write branch of the write operation branch 200W, the performance replica is repaired with data from the reliable replica. This repair may occur by taking the data from the reliable replica that was written in the corresponding write operation of step 220 to the reliable replica and by rewriting the data in the performance replica at the specified data location. Thus, data from a reliable copy in the persistent memory 106 or in the disk array 112 may be retrieved and then applied via writing in the performance replica to rewrite and repair the performance replica. An allocation for the location in the performance replica may, if necessary, be retained by the processor, but the data for filling the location may be retrieved from the reliable replica. In some embodiments the processor of the host computer 110 may help perform the repair of the performance replica. The repair of the performance replica may be deemed an asynchronous repair because this repair is performed after the write to the reliable replica is finished or at a different time from when the reliable write took place.

In a step 234 along the unsuccessful performance write branch of the write operation branch 200W, the update indicator that was set in step 218 is cleared. This update indicator may be a replication pending bit. Once the write operation is no longer occurring, then other operations do not need to be delayed because of the write operation. The processor of the host computer 110 may update the replication pending bit in the metadata database 109 in order to perform the step 218. Because the stale bit was set for the write instruction in step 218, the active replication pending bit may be changed in step 234 to indicate that no write action is currently pending/occurring to the replicas.

After step 234 of the unsuccessful performance write branch of the write operation branch 200W, point "D" is reached which means that the write operation branch 200W is concluded and a return to the asymmetric replication process 200 of FIG. 2A occurs. Thus, a check for a new operation instruction may be performed as a repeat of step 206 of the asymmetric replication process 200 shown in FIG. 2A.

Another alternative branch of the write operation branch 200W in FIG. 2C may be the non-successful replica write branch which after the determination of step 222 proceeds to step 236. This alternative branch occurs if in step 222 it was determined that the write for the reliable replica was not successful. In step 236, a label for the reliable replica is set to stale. The processor of the host computer 110 may adjust a stale bit in the metadata database 109 to indicate that the reliable replica is not current. This change of the label may give notice that other operations to the reliable replica should be deferred because the reliable replica no longer has fully current data. Individual disk addresses for the intended write may be labeled as part of the labelling of step 236. In some embodiments, if the reliable replica fails then the failure is considered fatal and all data from the multiple replicas system becomes unavailable and/or is marked as unavailable and/or stale.

After step 236 of the non-successful reliable write branch, step 234 may be performed similarly as was described above for the non-successful performance write branch. In a step 234 of the non-successful reliable write branch of the write operation branch 200W, the update indicator that was set in step 218 is cleared. The write operation is no longer current active and the stale bit was set in step 236. Thus, the replication pending bit for this write operation may be cleared and set to non-active. The processor of the host computer 110 may adjust the stale label in the metadata database 109 to indicate "not stale" if the repair is successful and if the intended data is correctly written into the reliable replica.

After step 234 of the non-successful reliable write branch of the write operation branch 200W, point "D" is reached so that these branches are concluded and a return to the asymmetric replication process 200 of FIG. 2A occurs. Then a check for any new operation instruction may be performed via a repeat of step 206 from FIG. 2A and a corresponding subsequent repeat of steps for performing any new operation instruction may occur.

For the repair of step 212 from FIG. 2B and/or for the repair of step 232 from FIG. 2C, this repair may be deemed asynchronous, e.g., with respect to the write of or read from the reliable copy. For the write of FIG. 2C, the operation may return success to the application because the reliable replica was written and may queue the repair to happen sooner or later. For the read of FIG. 2B, the repair may be attempted sooner hoping the performance disk is back up. In the case of the write of FIG. 2C, if, however, the performance disk is known to be down attempting repair later is advantageous.

In at least some embodiments, the stale bit for the reliable replica may be cleared only after both replicas have been successfully written to the same value. The asynchronous repair may perform this successful write to the performance replica after the write to the reliable replica is successful. For a read instruction of the read operation branch 200R of FIG. 2B, an equivalent repair may occur in step 212. In at least some embodiments, the step 214 of the read operation branch may clear stale bits for both replicas. Even though the data in the reliable replica may be not current, e.g., due to an earlier write failure to the reliable replica, after the above-mentioned rewrite of the performance replica both replicas contain the same data.

It may be appreciated that FIGS. 2A-2C provide illustrations of some embodiments and do not imply any limitations with regard to how different embodiments may be implemented. Many modifications to the depicted embodiment(s), e.g., to a depicted sequence of steps, may be made based on design and implementation requirements. Steps and features from the various processes may be combined into the other processes that are described in other drawings or embodiments.

In some embodiments, the performance copy may be for a sub-set of the entire data set instead of for the entire data set. In these embodiments, the replicas are cache-like although the replicas are still both in non-volatile storage instead of in volatile storage. A larger amount of storage space may be provided for the reliable replica than is provided for the performance replica. One or more less-frequently used portions of the data set may in some embodiments be evicted from the performance replica. The first copy may be a partial copy of the set of data and the second copy may be a full copy of the set of data.

In some embodiments, writes to the multiple replicas may be performed in parallel after one or more replication-pending bits are set. The present embodiments may include two or more independent allocations for the two or more replicas. The present embodiments may include hierarchical and/or nested replication/allocation with the differing types of replicas being configured and allocated separately in a nested manner. With read-intensive workloads in some embodiments benefits are achieved assuming writes are slower but are rare, asynchronous, or out of the critical path.

Writes are a bottleneck for the replica updates. Writes for reliable replicas may be slower than writes for performance replicas. Parallel writes for the reliable and performance replicas reduce write latency but are still dominated in time considerations by the writes for the reliable replicas. The writes to the reliable replicas are atomic. Therefore, the parallel writes to all replicas are safe. Most applications are insensitive to write latency and allow the multiple writes to be asynchronous. O_SYNC is used by some applications, however, and is inconsistent with completely asynchronous writes. Therefore, asynchronous writes may be avoided when O_SYNC is used.

In at least some embodiments storage replicas may be collocated in the same hardware failure domain for performance rather than for a usual industry practice of putting the multiple replicas into separate hardware failure domains for reliability.

Storage may fail during write, due to node, network, or device/media failures or other reasons. These failures are assumed to be transient and retry may be successful. If the failure is known to persist, the system may mark the storage as "unavailable". This 'unavailable' marking/label applies to the whole device, not just to specific disk addresses (DAs). Storage failures may have complex causes. Unavailable storage may later become available, e.g., due to a node restart. Storage availability can be determined easily. The global parallel file system may mark such disks as suspended. Assuming replicas on unavailable storage are bad may be more efficient than repeated attempts to write to those replicas. Replica consistency/synchronization (avoiding mismatched replicas) may be achieved by some replicated write mechanisms such as logging begin records or replication-pending bits. Handling a failed replicated write (i.e., when the reliable replica fails) is the responsibility of the application. Replication to multiple copies may occur at the same time (synchronously) or asynchronously.

In some embodiments, if a node fails another node may take over control of the reliable copy. A purpose of the reliable copy is to allow some failures to be tolerated and overcome. If the node (which may be referred to as a home node) that was controlling that storage went down, another node (namely the current node) can take over and still provide access to the storage. The home node that failed may be a disk array controller 108, e.g., a RAID controller. If such a failover has occurred, new writes to the current node may occur but still using the mapping of the home node. Thus, when the home node is repaired and control returns back to the home node and/or the first copy and the second copy are restarted on the home node the replica organization will better match the home node configuration. This configuring based on the home node after a failover to a backup node avoids allocating, organizing, and/or mapping blocks to the backup node based on a backup node configuration, when the backup node may only be used temporarily.

Figure 3:
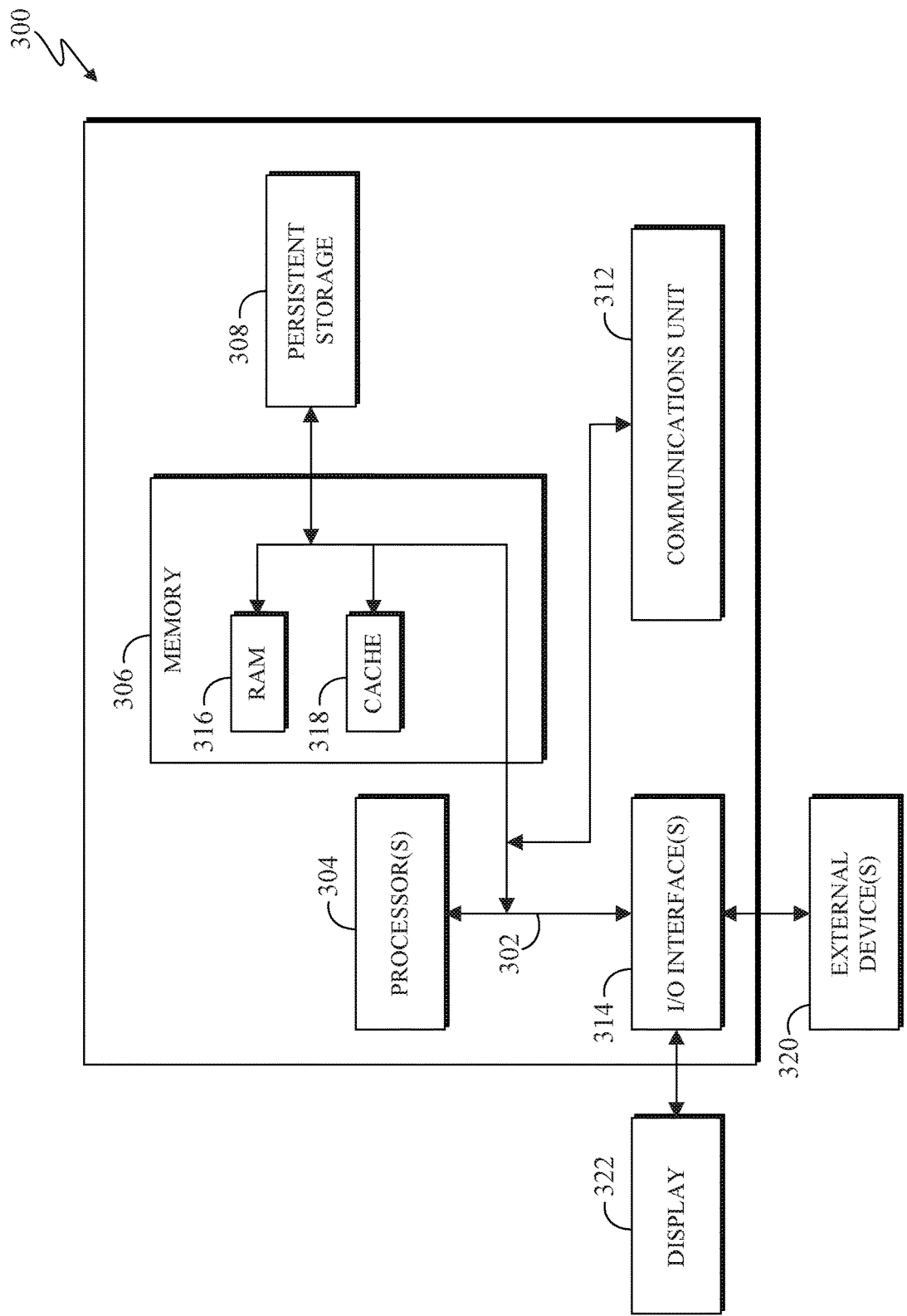
FIG. 3 is a block diagram of internal and external components of computers capable of implementing one or more of the foregoing methods according to at least one embodiment.

FIG. 3 is a block diagram 300 of internal and external components of computers depicted in FIGS. 1A-1C such as the host computer 110 and used in the processes of FIGS. 2A-2C in accordance with an illustrative embodiment. It should be appreciated that FIG. 3 provides only an illustration of one implementation and does not imply any limitations with regard to the environments in which different embodiments may be implemented. Many modifications to the depicted environments may be made based on design and implementation requirements. The block diagram 300 may be implemented in a general parallel file system which is a high performance clustered file system.

As depicted, the block diagram 300 of FIG. 3 shows a computer which includes communications fabric 302, which provides communications between computer processor(s) 304, memory 306, persistent storage 308, communications unit 312, and input/output (I/O) interface(s) 314. Communications fabric 302 may be implemented with any architecture designed for passing data and/or control information between processors (such as microprocessors, communications and network processors, etc.), system memory, peripheral devices, and any other hardware components within a system. For example, communications fabric 302 may be implemented with one or more buses. The computer processor 304 may include logic and/or algorithms to allow the computer to perform the processes described in FIGS. 2A-2C and to be used in place of the host computer 110 shown in FIGS. 1A-1C.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

One or more programs may be stored in persistent storage 308 for access and/or execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links.

I/O interface(s) 314 allows for input and output of data with other devices that may be connected to the computer. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 308 via I/O interface(s) 314. I/O interface(s) 314 also connect to a display 322.

Display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for asymmetric replication of data, the method comprising:
   organizing storage of a set of data as a first copy in non-volatile storage and as a second copy in non-volatile storage, wherein the first copy is stored so as to be readable at a first speed and the second copy is reliable and stored so as to be readable at a second speed slower than the first speed;
   receiving a read instruction regarding the set of data;
   performing the read instruction preferentially via the first copy such that the asymmetric replication achieves enhanced performance speed;
   receiving a request to execute a write operation;
   in response to receiving the request to execute the write operation, setting a replication pending bit in a metadata database indicating that a write operation is in progress so that other instructions should be postponed;
   executing the write operation to the first copy and to the second copy;
   determining whether the write operation to the first copy was successful and whether the write operation to the second copy was successful;
   in response to determining that the write operation to the first copy was unsuccessful, setting a label for the first copy as stale, the label being in the metadata database; and
   in response to determining that the write operation to the second copy is successful, clearing the replication pending bit.

2. The method of claim 1, the method further comprising skipping the write operation to the first copy in response to the determining that write operation to the first copy was unsuccessful.

3. The method of claim 1, further comprising repairing the first copy with written data from the write operation to the second copy.

4. The method of claim 1, wherein the second copy is stored in a redundant manner so as to be reconstructable after an error.

5. The method of claim 1, further comprising checking whether the first copy is stale;
   wherein the read instruction is performed via the second copy instead of via the first copy in response to determining that the first copy is stale.

6. The method of claim 1, further comprising checking whether the first copy is stale;
   wherein the read instruction is performed via the first copy in response to determining that the first copy is not stale.

7. The method of claim 1, further comprising:
   organizing storage of the set of data as a third copy in non-volatile storage, wherein the third copy is stored so as to be readable at a third speed faster than the second speed; and
   checking whether the first copy is stale;
   wherein the read instruction is performed via the third copy instead of the first copy in response to determining that the first copy is stale.

8. A computer system for asymmetric replication of data, the computer system comprising:
   one or more processors and one or more computer-readable memories comprising non-volatile storage, the one or more processors being configured to cause the computer system to:
   organize storage of a set of data as a first copy in the non-volatile storage and as a second copy in the non-volatile storage, wherein the first copy is stored so as to be readable at a first speed and the second copy is reliable and stored so as to be readable at a second speed slower than the first speed;
   receive a read instruction regarding the set of data;
   perform the read instruction preferentially via the first copy such that the asymmetric replication achieves enhanced performance speed;
   receive a request to execute a write operation;
   in response to receiving the request to execute the write operation, set a replication pending bit in a metadata database indicating that a write operation is in progress so that other instructions should be postponed;
   execute the write operation to the first copy and to the second copy;
   determine whether the write operation to the first copy was successful and whether the write operation to the second copy was successful;
   in response to determine that the write operation to the first copy was unsuccessful, setting a label for the first copy as stale, the label being in the metadata database; and
   in response to determining that the write operation to the second copy is successful, clear the replication pending bit.

9. The computer system of claim 8, wherein the non-volatile storage in which the first copy is stored comprises a performance disk.

10. The computer system of claim 9, wherein a controller for the second copy is also stored in the performance disk and a remaining portion of the second copy is stored in a distributed manner amongst other computer memories.

11. The computer system of claim 8, wherein the second copy is stored in an erasure coded virtual disk.

12. The computer system of claim 8, wherein the one or more processors are configured to further cause the computer system to check whether the first copy is stale;
   wherein the read instruction is performed via the second copy instead of via the first copy in response to determining that the first copy is stale.

13. The computer system of claim 8, wherein the one or more processors are configured to further cause the computer system to check whether the first copy is stale;

wherein the read instruction is performed via the first copy in response to determining that the first copy is not stale.

14. The computer system of claim 8, wherein the first copy is a partial copy of the set of data and the second copy is a full copy of the set of data.

15. A computer-implemented method for asymmetric replication of data, the method comprising:
   organizing storage of a set of data as a first copy in non-volatile storage and as a second copy in non-volatile storage, wherein the first copy is stored so as to be readable at a first speed and the second copy is stored so as to be readable at a second speed slower than the first speed, the first copy and at least part of the second copy being in a same first node;
   creating an indicator that indicates whether a write operation is in progress;
   creating one or more bits indicating whether at least some of the first copy and the second copy is stale;
   receiving an operation request regarding the set of data;
   checking the indicator and the one or more bits associated with the operation request to determine a status of first data related to the operation request, the first data being in at least one of the first and the second copies; and
   performing the operation request preferentially via the first copy or via the second copy based on the status of the indicator and the one or more bits.

16. The method of claim 15, wherein the second copy is stored as an erasure coding in the non-volatile storage.

17. The method of claim 15, wherein the status of the one or more bits indicates that the first copy is stale, the operation request is a read instruction, and the read instruction is performed via reading from the second copy.

18. The method of claim 15, wherein the status of the one or more bits indicates that the first copy is not stale, the operation request is a read instruction, and the read instruction is performed via reading from the first copy.

19. The method of claim 15, wherein the status of the one or more bits indicates that the first copy is stale, the operation request is a write instruction, the write instruction is performed to the second copy, and the write to the first copy is deferred to a later time.

20. The method of claim 15, wherein the second copy is a reliable copy stored in a redundant manner so as to be reconstructable after an error.

21. The method of claim 15, wherein the first copy is a partial copy of the set of data and the second copy is a full copy of the set of data.

22. A computer system for asymmetric replication of data, the computer system comprising:
   one or more processors and one or more computer-readable memories comprising non-volatile storage, the one or more processors being configured to cause the computer system to:
      organize storage of a set of data as a first copy in the non-volatile storage and as a second copy in the non-volatile storage, wherein the first copy is stored so as to be readable at a first speed and the second copy is stored so as to be readable at a second speed slower than the first speed, wherein the first copy and at least part of the second copy are in a same first node;
      create an indicator that indicates whether a write operation is in progress;
      create one or more bits indicating whether at least some of the first copy and the second copy is stale;
      receive an operation request regarding the set of data;
      check the indicator and the one or more bits associated with the operation request to determine a status of first data related to the operation request, the first data being in at least one of the first and the second copies; and
      perform the operation request preferentially via the first copy or via the second copy based on the status of the indicator and the one or more bits.

23. A computer-implemented method for asymmetric replication of data, the method comprising:
   organizing storage of a set of data as a first copy in non-volatile storage, as a second copy in non-volatile storage, and as a third copy in non-volatile storage, wherein the first copy is stored so as to be readable at a first speed, the second copy is reliable and stored so as to be readable at a second speed slower than the first speed, and the third copy is stored so as to be readable at a third speed faster than the second speed;
   receiving a read instruction regarding the set of data;
   performing the read instruction preferentially via the first copy or the third copy such that the asymmetric replication achieves enhanced performance speed;
   receiving a request to execute a write operation;
   executing the write operation to the first copy and to the second copy;
   determining whether the write operation to the first copy was successful and whether the write operation to the second copy was successful; and
   in response to determining that the write operation to the first copy was unsuccessful, setting a label for the first copy as stale.

24. The method of claim 23, wherein the second copy is a reliable copy stored in a redundant manner so as to be reconstructable after an error.

25. The method of claim 23, further comprising checking whether the first copy is stale;
   wherein the read instruction is performed via the third copy instead of the first copy in response to determining that the first copy is stale.

\* \* \* \* \*